(12) United States Patent
Jeong et al.

(10) Patent No.: US 8,769,980 B2
(45) Date of Patent: Jul. 8, 2014

(54) APPARATUS FOR PURIFYING WATER

(75) Inventors: Kyung-Han Jeong, Seoul (KR); Kwang-Ha Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/264,318

(22) PCT Filed: Jun. 24, 2009

(86) PCT No.: PCT/KR2009/003388
§ 371 (c)(1),
(2), (4) Date: Oct. 13, 2011

(87) PCT Pub. No.: WO2010/120012
PCT Pub. Date: Oct. 21, 2010

(65) Prior Publication Data
US 2012/0036883 A1    Feb. 16, 2012

(30) Foreign Application Priority Data
Apr. 15, 2009    (KR) .................. 10-2009-0032908

(51) Int. Cl.
*F25C 5/18*    (2006.01)
(52) U.S. Cl.
USPC ............................................. 62/344; 62/347
(58) Field of Classification Search
CPC ........ C02F 1/003; C02F 2307/10; F25C 1/04; F25C 5/002; F25C 2305/022
USPC ................... 62/344, 135, 347, 353, 138, 139
See application file for complete search history.

(56) References Cited

U.S. PATENT DOCUMENTS

| 2,730,865 | A | * | 1/1956 | Murdock | 62/138 |
|---|---|---|---|---|---|
| 3,043,113 | A | * | 7/1962 | Muffly | 62/137 |
| 3,045,445 | A | * | 7/1962 | MacLeod | 62/137 |
| 3,274,792 | A | * | 9/1966 | Weil et al. | 62/138 |
| 5,112,477 | A |   | 5/1992 | Hamlin | |
| 5,484,538 | A |   | 1/1996 | Woodward | |
| 6,506,428 | B1 |   | 1/2003 | Berge et al. | |
| 6,964,177 | B2 | * | 11/2005 | Lee et al. | 62/320 |
| 7,228,703 | B2 | * | 6/2007 | Kim et al. | 62/353 |
| 7,493,777 | B2 | * | 2/2009 | Kim et al. | 62/353 |
| 7,617,693 | B2 | * | 11/2009 | Lee | 62/135 |
| 2005/0155360 | A1 | * | 7/2005 | Yoshida et al. | 62/135 |
| 2007/0089451 | A1 |   | 4/2007 | Lee | |

FOREIGN PATENT DOCUMENTS

| CN | 1952538 A | 4/2007 |
|---|---|---|
| FR | 2424494 A1 | 11/1979 |
| JP | 54-143775 A | 11/1979 |

(Continued)

*Primary Examiner* — Mohammad M Ali
(74) *Attorney, Agent, or Firm* — Birch, Stewart, Kolasch & Birch, LLP

(57) ABSTRACT

An apparatus for purifying water comprises: an ice making unit configured to make introduced water into ice cubes, and to store the ice cubes; a cold water unit configured to generate cold water by receiving the ice cubes made by the ice making unit; and a cooling unit configured to supply cold air to the ice making unit. Firstly, since cold water is generated by using ice cubes made by the ice making unit, may be solved the conventional problem that the ice cubes cling to each other due to contact with the cold water. Secondly, the ice making unit, the cold water unit, etc. may be installed so as to be stacked with each other in upper and lower directions, the apparatus for purifying water may have a slim configuration.

12 Claims, 6 Drawing Sheets

(56) References Cited

FOREIGN PATENT DOCUMENTS

| KR | 10-1999-0080048 A | 11/1999 |
|---|---|---|
| KR | 20-1999-0041499 U | 12/1999 |
| KR | 20-2000-0017945 U | 10/2000 |
| KR | 10-0407867 B1 | 12/2003 |
| KR | 10-2005-0104129 A | 11/2005 |
| KR | 10-2007-0104093 A | 10/2007 |
| KR | 20-0440254 Y1 | 6/2008 |

* cited by examiner

APPARATUS FOR PURIFYING WATER

TECHNICAL FIELD

The present invention relates to an apparatus for purifying water, and more particularly, to an apparatus for purifying water capable of making cold water and ice cubes and providing them to a user.

BACKGROUND ART

Generally, an apparatus for purifying water serves to filter harmful ingredients such as foreign materials or heavy metals included in water in a physical or chemical manner. A similar apparatus to the water purifier may include an ionized water apparatus, etc.

This water purifier may be largely divided into a filtering unit for filtering contaminants from raw water, a storing unit for storing purified water having passed through the filtering unit, and a discharging unit for providing the purified water stored in the storing unit to a consumer.

Generally, the apparatus for purifying water is supplied to homes, companies, factories, etc. due to consumers' high concerns about health and a recent bad water quality.

As the apparatus for purifying water is universally supplied, increased are the consumers' demands for an apparatus for purifying water having an additional function to provide hot water and cold water as well as to purify water.

Nowadays, manufacturers for the apparatus for purifying water present out an apparatus for purifying water having an additional function to provide ice cubes, thereby attracting the consumers' interests.

The apparatus for purifying water having a function to provide ice cubes has a structure that a refrigerant pipe along which a refrigerant having a low temperature flows is immersed in purified water accommodated in a predetermined container. Here, the purified water around the refrigerant pipe is frozen to form ice cubes, whereas the purified water accommodated in the container is cooled into cold water through heat exchange with the refrigerant pipe.

In this case, the temperature of the cold water is determined according to a heat exchange rate with a heat exchanger until the ice cubes are frozen to a predetermined size. Accordingly, it is difficult to control the temperature of the cold water in accordance with a consumer's demand.

Furthermore, the temperature of the cold water is varied according to a distance between the heat exchanger and the purified water. This may cause the temperature of the cold water provided to the consumer not to be constant.

DISCLOSURE OF INVENTION

Technical Problem

In the conventional apparatus for purifying water having a function to provide ice cubes, cold water accommodated in the container and cooled by the refrigerant pipe, and ice cubes formed by the refrigerant pipe fall down when the container is turned upside down. Furthermore, a container for accommodating ice cubes and a container for accommodating cold water are provided in parallel in a horizontal direction.

This may cause a front width of the apparatus for purifying water to be wide, which is not suitable for a recent slim configuration of home electronic appliances.

Furthermore, when the ice cubes and the cold water come in contact with each other, the ice cubes may cling to each other due to moisture on their surfaces.

Technical Solution

Therefore, it is an object of the present invention to provide an apparatus for purifying water capable of preventing ice cubes from clinging to each other due to contact with cold water, and capable of implementing a slim configuration.

To achieve these and other advantages and in accordance with the purpose of the present invention, as embodied and broadly described herein, there is provided an apparatus for purifying water, comprising: an ice making unit configured to make introduced purified water into ice cubes, and to store the ice cubes; a cold water unit configured to generate cold water by receiving the ice cubes made by the ice making unit; and a cooling unit configured to supply cold air to the ice making unit.

The ice making unit may comprise an ice maker configured to make accommodated purified water into ice cubes; and an ice storing unit configured to store the ice cubes discharged from the ice maker, and to selectively supply the ice cubes to the cold water unit or outside.

The ice storing unit may comprise an ice container having first and second openings at one side and another sides thereof, respectively, and configured to accommodate the ice cubes therein; and an ice transferring portion disposed in the ice container, and configured to transfer the ice cubes to the first opening or the second opening.

The first and second openings may be disposed on surfaces of the ice container facing each other.

The ice transferring portion may comprise a rotation shaft having both ends disposed to be toward the first and second openings, respectively; a transferring screw disposed on an outer circumference of the rotation shaft in a radius direction, and configured to transfer the ice cubes when the rotation shaft is rotated; and a rotation driving portion disposed at one end of the rotation shaft, and configured to rotate the rotation shaft.

One of the first and second openings may be communicated with a discharging unit configured to discharge the ice cubes to outside, and another of the first and second openings may be implemented to guide the ice cubes to the cold water unit.

A transfer direction of the ice cubes may be determined according to a rotation direction of the rotation shaft.

The discharging unit may comprise an ice discharge duct configured to guide discharge of the ice cubes; and an opening/closing member configured to selectively open or close the end of the ice discharge duct in a discharge direction of the ice cubes.

On an outer circumferential surface of the ice discharge duct, may be installed a cold water discharge pipe through which cold water is discharged out from the cold water unit.

The ice making unit, the ice storing unit, and the cold water unit may be stacked with each other in upper and lower directions.

The apparatus for purifying water may further comprise a hot water unit configured to heat received purified water to a predetermined temperature, and to store the heated purified water therein. The hot water unit may be installed just below the cold water unit.

Preferably, long edges of the ice maker, and the transferring screw may be installed in back and forth directions of the apparatus for purifying water.

The cooling unit may be coupled to an outer surface of the ice maker, so as to freeze the purified water accommodated in the ice maker by conduction.

The ice making unit and the cooling unit may be disposed in an ice making chamber formed by a heat insulation member. And, may be further provided a blowing unit configured to blow cold air generated by the cooling unit to the ice making unit.

The apparatus for purifying water according to the present invention may have the following advantages.

Firstly, since cold water is generated by using ice cubes made by the ice making unit, may be solved the conventional problem that the ice cubes cling to each other due to contact with the cold water.

Secondly, the ice making unit, the cold water unit, etc. may be installed so as to be stacked with each other in upper and lower directions, the apparatus for purifying water may have a slim configuration.

BEST MODE FOR CARRYING OUT THE INVENTION

Reference will now be made in detail to the preferred embodiments of the present invention, examples of which are illustrated in the accompanying drawings.

Hereinafter, an apparatus for purifying water according to a first embodiment of the present invention will be explained in more detail with reference to the attached drawings.

Figure 1:
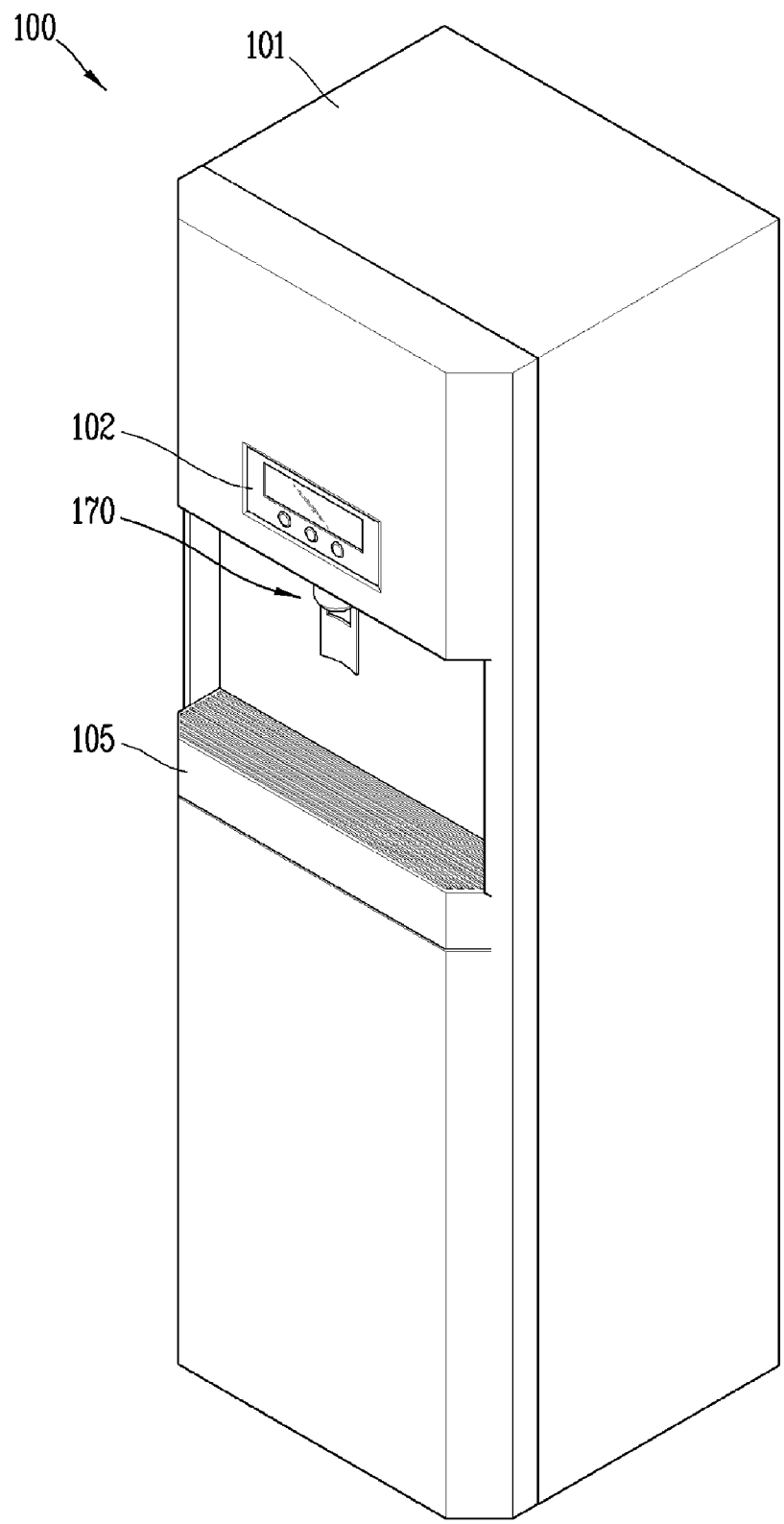
FIG. 1 is a view showing the appearance of an apparatus for purifying water according to a first embodiment of the present invention.
Figure 2:
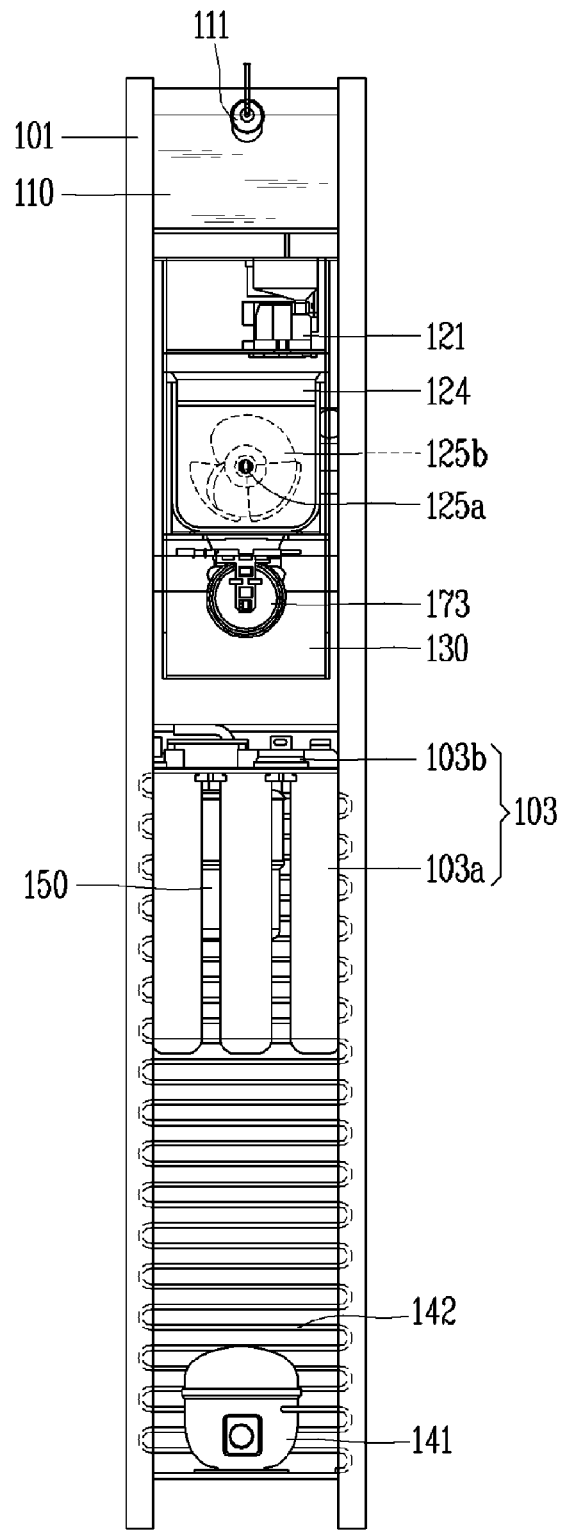
FIG. 2 is a view showing an inner part of a front surface of the apparatus for purifying water of FIG. 1.
Figure 3:
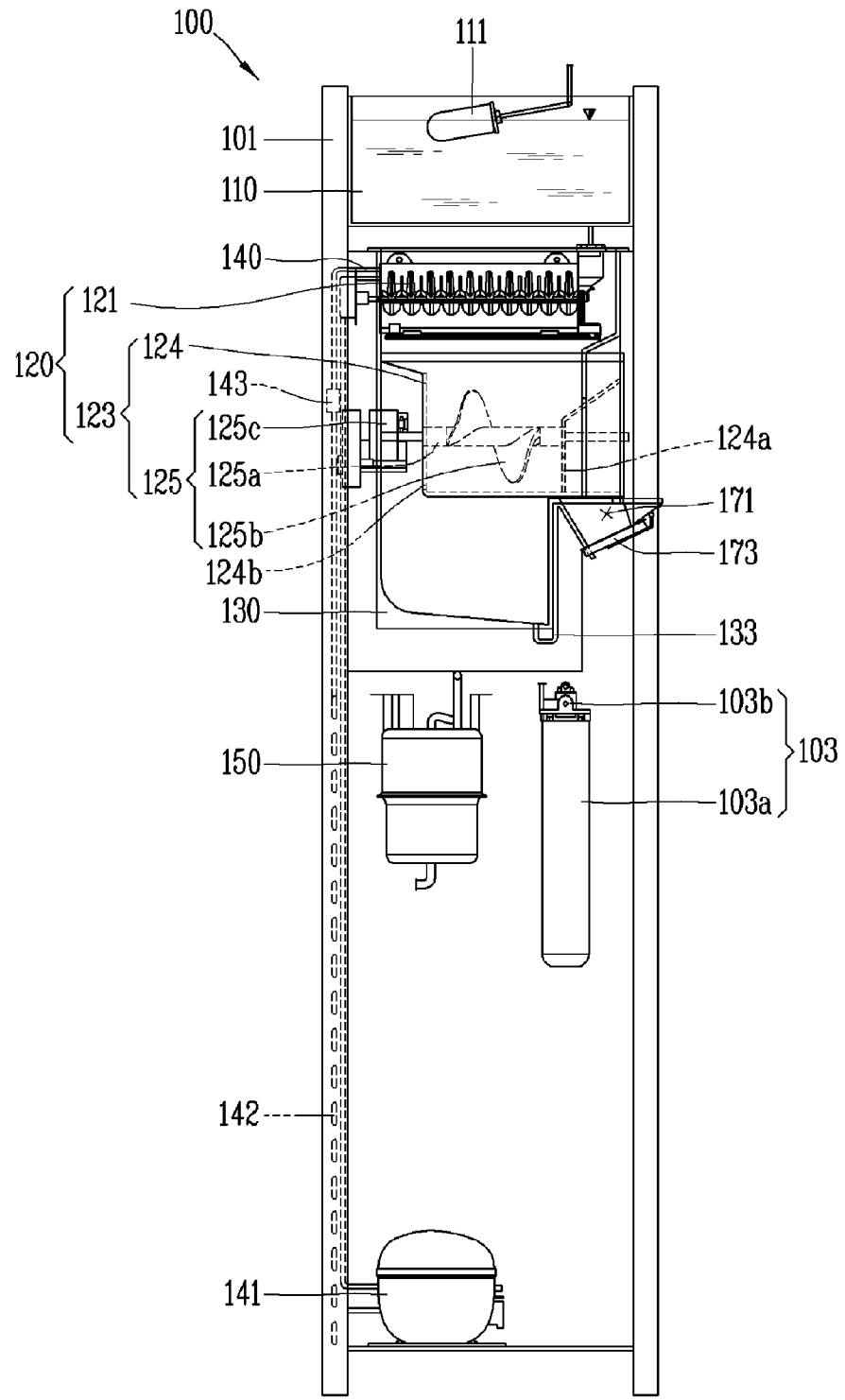
FIG. 3 is a view showing an inner part of a side surface of the apparatus for purifying water of FIG. 1.
Figure 4:
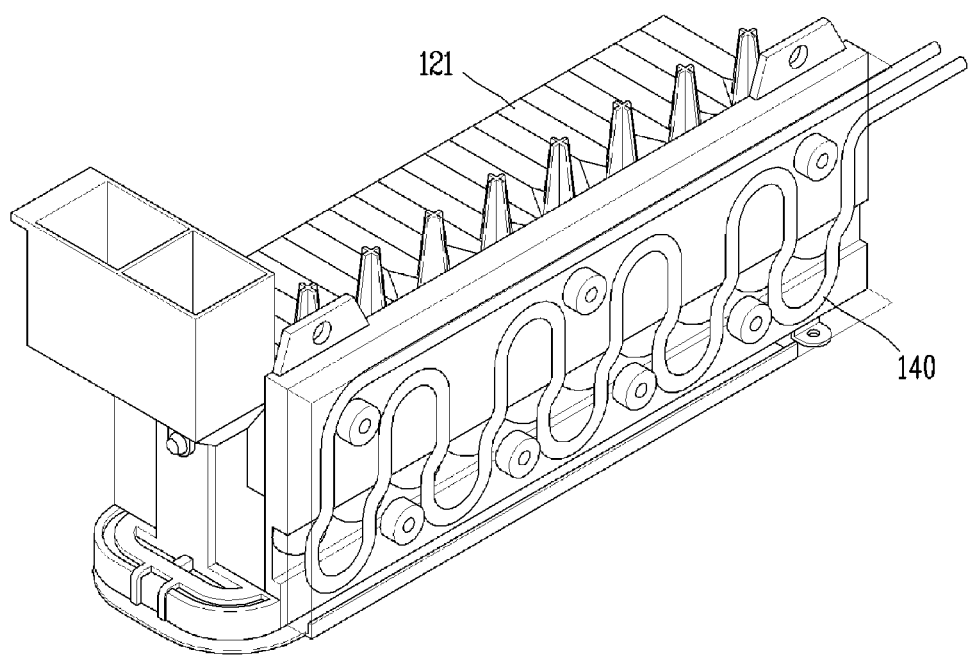
FIG. 4 is a disassembled perspective view of an ice maker of FIG. 1.
Figure 5:
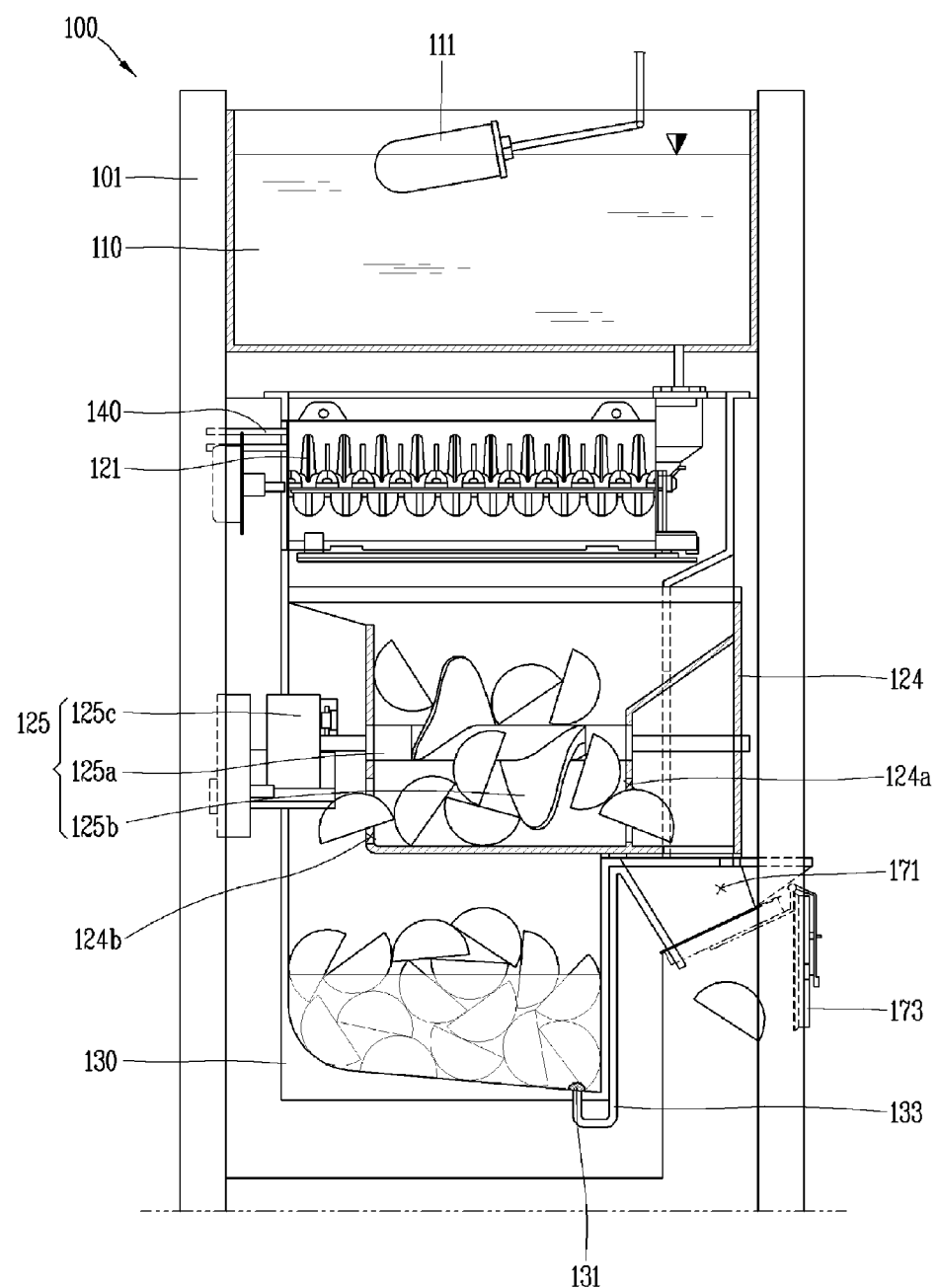
FIG. 5 is a view showing each operation of an ice making unit and a cold water unit of the apparatus for purifying water of FIG. 1.

FIG. 1 is a view showing the appearance of an apparatus for purifying water according to a first embodiment of the present invention, FIG. 2 is a view showing an inner part of a front surface of the apparatus for purifying water of FIG. 1, FIG. 3 is a view showing an inner part of a side surface of the apparatus for purifying water of FIG. 1, FIG. 4 is a disassembled perspective view of an ice maker of FIG. 1, and FIG. 5 is a view showing each operation of an ice making unit and a cold water unit of the apparatus for purifying water of FIG. 1.

Firstly, an apparatus for purifying water according to a first embodiment of the present invention will be explained in more detail with reference to FIGS. 1 to 3.

Referring to FIGS. 1 to 3, an apparatus for purifying water according to a first embodiment of the present invention 100 comprises a case 101 configured to form the appearance, and having a plurality of components mounted therein; a filtering unit 103 configured to filter water introduced from a water supply source, etc. into purified water; a purified water storing unit 110 configured to store the purified water therein; an ice making unit 120 configured to make introduced purified water into ice cubes; a cold water unit 130 configured to cool the purified water and store it in a cold water state.

Generally, the case 101 is formed in a hexagonal shape. However, the case 101 may have various forms for enhanced designs.

On a front surface of the case 101, disposed is a state displaying portion 102 configured to display, to outside, a state of the apparatus for purifying water (e.g., purified water amount, hot water amount, cold water amount, ice cubes amount, temperature of hot water, temperature of cold water, whether or not an ice cube making mode is operated, etc.).

The case 101 is further provided with a discharging unit 170 configured to discharge purified water, cold water, ice cubes, etc. out.

Preferably, one or more surfaces of the case 101 are configured to be opened and closed so as to clean or repair components inside the case 101.

Just below the discharging unit 170, may be further provided a remaining water collector 105 configured to collect remaining water not having been accommodated in a container, etc. while discharging out purified water, ice cubes, etc.

Preferably, the remaining water collector 105 is detachably installed at the case 101 so as to easily remove remaining water.

The filtering unit 103 includes one or more filters 103a, and one or more filter heads 103b configured to fixedly-couple the filters 103a thereto. The number of the filters 103 is varied according to a manufacturer's purposes.

The purified water storing unit 110 serves to store therein water purified through the filtering unit 103, and a maximum storage amount of the purified water is controlled by a floating valve 111.

For smooth supply of the purified water and control of a supply amount of the purified water, the purified water storing unit 110 is preferably installed above the ice making unit 120, the cold water unit 130, etc.

The ice making unit 120 includes an ice maker 121 configured to make purified water received from the purified water storing unit 110 into ice cubes, and an ice storing unit 123 configured to store the ice cubes discharged from the ice maker 121.

Preferably, the ice maker 121 receives purified water stored in the purified water storing unit 110, through a tube connected to the purified water storing unit 110. And, the ice storing unit 123 is preferably disposed below the ice maker 121, thereby accommodating therein ice cubes discharged from the ice maker 121 to drop by the gravity.

The cold water unit 130 is implemented as a container capable of containing liquid therein. And, a cold water discharge pipe 133 configured to supply cold water to the discharging unit 170 is connected to the cold water unit 130.

The cold water unit 130 is communicated with the ice storing unit 123, so as to receive ice cubes from the ice storing unit 123.

Accordingly, ice cubes supplied from the ice storing unit 123 are melted to be stored in the cold water unit 130 in the form of cold water.

Alternatively, under a state that the purified water stored in the purified water storing unit 110 has been supplied to the cold water unit 130, ice cubes supplied from the ice storing unit 123 are melted in the cold water unit 130, thereby cooling the purified water into cold water.

In the apparatus for purifying water, cold water can be generated without providing an additional heat exchanger to the cold water unit 130. This may allow the number of processes required to additionally install the heat exchanger to be reduced, and prevent increase of a volume of the cold water unit 130.

Accordingly, the case 101 of the apparatus for purifying water 100 may have a slimmer configuration.

The ice storing unit 123 includes an ice container 124 configured to accommodate the ice cubes discharged from the ice maker 121.

The ice container 124 is provided with a first opening 124a and a second opening 124b communicated with the discharging unit 170 and the cold water unit 130, respectively.

The first and second openings 124a, 124b may be disposed on surfaces of the ice container 124 facing each other.

The ice storing unit 123 may include an ice transferring portion 125 disposed in the ice container 124 and configured to transfer the ice cubes to the first and second openings 124a, 124b.

The ice transferring portion 125 may include a rotation shaft 125a having both ends disposed to be toward the first and second openings 124a, 124b respectively; a transferring screw 125b disposed on an outer circumference of the rotation shaft 125a in a radius direction, and configured to transfer the ice cubes when the rotation shaft 125a is rotated; and a rotation driving portion 125c disposed at one end of the rotation shaft 125a, and configured to rotate the rotation shaft 125a.

The rotation driving portion 125c is implemented to rotate the rotation shaft 125a in a forward or backward direction. Accordingly, the transferring screw 125b serves to transfer the ice cubes to the first opening 124a or the second opening 124b.

The discharging unit 170 may include an ice discharge duct 171 configured to guide discharge of the ice cubes; and an opening/closing member 173 disposed at the end of the ice discharge duct 171 in a discharge direction of the ice cubes, and configured to selectively open or close the end of the ice discharge duct 171.

The opening/closing member 173 is implemented to be opened only when the ice cubes are discharged out, thereby preventing a problem that the ice cubes may melt due to supply of external air into the ice container 124.

A cold water discharge pipe 133 through which cold water is discharged out from the cold water unit 130 may be installed at the ice discharge duct 171.

At a connection part between the cold water unit 130 and the cold water discharge pipe 133, preferably disposed is a filtering net 131 configured to prevent the ice cubes inside the cold water unit 130 from being introduced into the cold water discharge pipe 133.

The cold water discharge pipe 133 may be fixed on an inner surface or an outer surface of the ice discharge duct 171.

The reason is in order to provide ice water to a user by making outlets for cold water and ice cubes adjacent to each other, without changing the position of the container for accommodating the ice cubes or cold water therein.

The apparatus for purifying water 100 may further comprise a hot water storing unit 150 configured to store hot water heated to a predetermined temperature by a heating means (e.g., heat wire) disposed at an outer side, by receiving purified water from the purified water storing unit 110.

In the apparatus for purifying water 100, the purified water storing unit 110, the ice making unit 120, the cold water unit 130, etc. are preferably installed in the case 101 so as to be staked with each other in upper and lower directions.

Preferably, the ice maker 121 and the ice storing unit 123 of the ice making unit 120 are installed with a stacked state to each other. And, the cold water unit 130 is preferably disposed below the ice storing unit 123.

Preferably, the hot water storing unit 150 is positioned just below the cold water unit 130.

Preferably, a longitudinal direction of the filter 103a of the filtering unit 103 is consistent with a height direction of the case 101.

This may allow the case 101 to have a slim configuration, thereby enhancing the appearance of the apparatus for purifying water 100.

By providing the rotation shaft 125a of the ice transferring portion 125 in back and forth directions, a horizontal width of a front surface of the case 101 can be made to be slim.

Here, the ice maker 121 is preferably installed in back and forth directions of the apparatus for purifying water 100. That is, long edges of the ice maker 121 are preferably disposed in back and forth directions of the apparatus for purifying water 100.

Next, the cooling unit 140 of the apparatus for purifying water 100 according to the first embodiment of the present invention will be explained with reference to FIG. 4.

Referring to FIG. 4, the cooling unit 140 is implemented as a refrigerant pipe through which a refrigerant having a low temperature passes.

For this, a compressor 141, a condenser 142, and an expander 143 are disposed in the case 101. And, a refrigerant pipe through which a refrigerant having a low temperature passes serves as the cooling unit 140.

The cooling unit 140 is coupled to an outer surface of the ice maker 121, so as to freeze the purified water accommodated in the ice maker 121 by conduction.

Preferably, the ice maker 121 is formed of a material having a high thermal conductivity. And, the cooling unit 140 is preferably bent a plurality of times so as to increase a contact area with the ice maker 121.

Next, the operation of the apparatus for purifying water according to the present invention will be explained with reference to FIG. 5.

Referring to FIG. 5, the purified water filtered by the filtering unit 103 is supplied to the ice maker 121 from the purified water storing unit 110, thereby being frozen in ice cubes. And, the ice cubes are discharged to the ice storing unit 123 disposed below the ice maker 121, and are stored therein.

Some of the ice cubes stored in the ice storing unit 123 are supplied to the cold water unit 130 by rotation of the transferring screw 125b of the ice transferring portion 125, thereby generating cold water.

The number of the ice cubes supplied to the cold water unit 130 may be controlled according to the temperature of cold water stored in the cold water unit 130, or a water level of the cold water.

Once an ice cube discharge signal is input from outside, the transferring screw 125b is rotated in an opposite direction to the rotation direction when supplying the ice cubes to the cold water unit 130, thereby transferring the ice cubes to the discharging unit 170. As the opening/closing member 173 is opened, the ice cubes are discharge to outside.

Hereinafter, an apparatus for purifying water according to a second embodiment of the present invention will be explained with reference to FIG. 6.

The same configurations as those of the first embodiment, and their detailed descriptions will be omitted.

Figure 6:
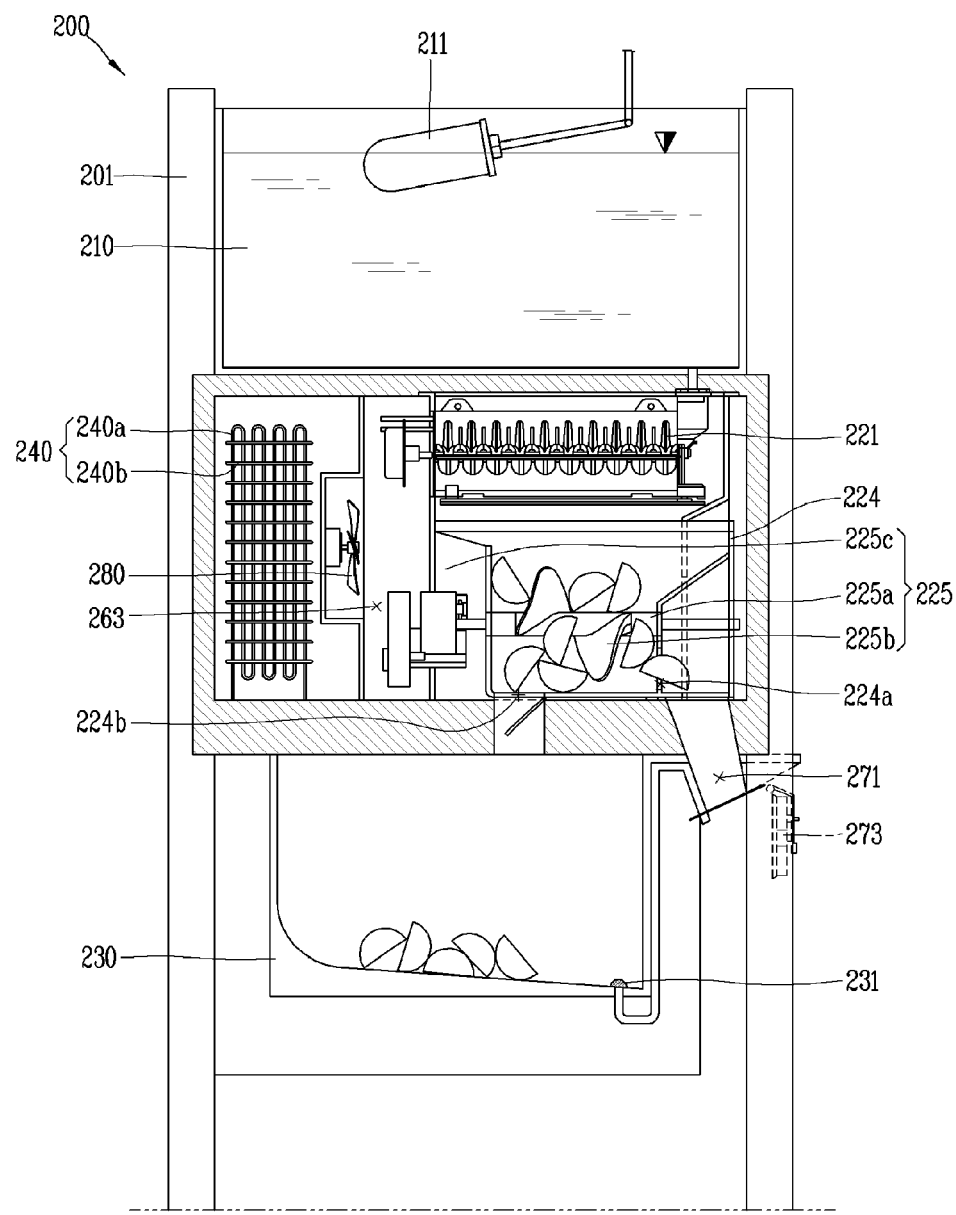
FIG. 6 is a view showing an inner part of a side surface of an apparatus for purifying water according to a second embodiment of the present invention.

Referring to FIG. 6, an apparatus for purifying water according to a second embodiment of the present invention 200 further comprises an ice making chamber 263 partitioned by a heat insulation member 261 in the case 201.

In the ice making chamber 263, installed is an ice making unit 220 including an ice maker 221 and an ice storing unit 223.

The cooling unit 240 is also installed in the ice making chamber 263.

Differently from the first embodiment, the cooling unit 240 is preferably implemented as a heat exchanger having refrigerant pipes 240a bent a plurality of times, and a plurality of heat emitting fins 240b disposed on outer surfaces of the refrigerant pipes 240a.

Preferably, further provided is a blowing unit 280 configured to blow cold air generated by the cooling unit 240 to the ice making unit 220.

Accordingly, can be solved lowering of a heat exchange efficiency due to frost condensed on an outer surface of the cooling unit 240 when the cooling unit 240 and the ice maker 221 come in direct contact with each other.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An apparatus for purifying water, comprising:
   an ice making unit configured to make introduced water into ice cubes, and to store the ice cubes;
   a cold water unit configured to generate cold water by receiving the ice cubes made by the ice making unit; and
   a cooling unit configured to supply cold air to the ice making unit,
   wherein the ice making unit comprises:
      an ice maker disposed in a body, the ice maker configured to make water into ice cubes; and
      an ice storing unit configured to store the ice cubes discharged from the ice maker, the ice storing unit comprising:
         an ice container having first and second openings through which the ice cubes are discharged out; and
         an ice transferring portion disposed in the ice container, and configured to transfer the ice cubes to the first opening or the second opening,
      wherein the ice storing unit selectively supplies the ice cubes to the cold water unit via the second opening or outside via the first opening.

2. The apparatus for purifying water of claim 1, wherein the first and second openings are disposed on surfaces of the ice container facing each other.

3. The apparatus for purifying water of claim 1, wherein the ice transferring portion comprises:
   a rotation shaft; and
   a transferring screw attached to the rotation shaft, and configured to transfer the ice cubes when the rotation shaft is rotated.

4. The apparatus for purifying water of claim 1, wherein the first opening is communicated with a discharging unit configured to discharge the ice cubes out of the body, and the second opening serves to guide the ice cubes to the cold water unit.

5. The apparatus for purifying water of claim 3, wherein a transfer direction of the ice cubes is determined according to a rotation direction of the rotation shaft.

6. The apparatus for purifying water of claim 4, wherein the discharging unit comprises:
   an ice discharge duct configured to guide discharge of the ice cubes; and
   an opening/closing member configured to selectively open or close the end of the ice discharge duct in a discharge direction of the ice cubes.

7. The apparatus for purifying water of claim 6, wherein on an outer circumferential surface of the ice discharge duct, installed is a cold water discharge pipe through which cold water is discharged out from the cold water unit.

8. The apparatus for purifying water of claim 1, wherein the ice maker, the ice storing unit, and the cold water unit are stacked with each other in upper and lower directions.

9. The apparatus for purifying water of claim 8, further comprising a hot water unit configured to heat received water to a predetermined temperature, and to store the heated water therein.

10. The apparatus for purifying water of claim 8, wherein the transferring screw is installed in back and forth directions of the apparatus for purifying water.

11. The apparatus for purifying water of claim 1, wherein the cooling unit is coupled to an outer surface of the ice maker, so as to freeze the water accommodated in the ice maker by conduction.

12. The apparatus for purifying water of claim 1, further comprising:
   an ice making chamber formed by a heat insulation member; and
   a blowing unit configured to blow cold air generated by the cooling unit to the ice making unit,
   wherein the ice making unit and the cooling unit are disposed in the ice making chamber.

* * * * *